Aug. 28, 1951  W. S. RENIER  2,565,522
MOLDING MACHINE
Filed May 5, 1947  4 Sheets-Sheet 2
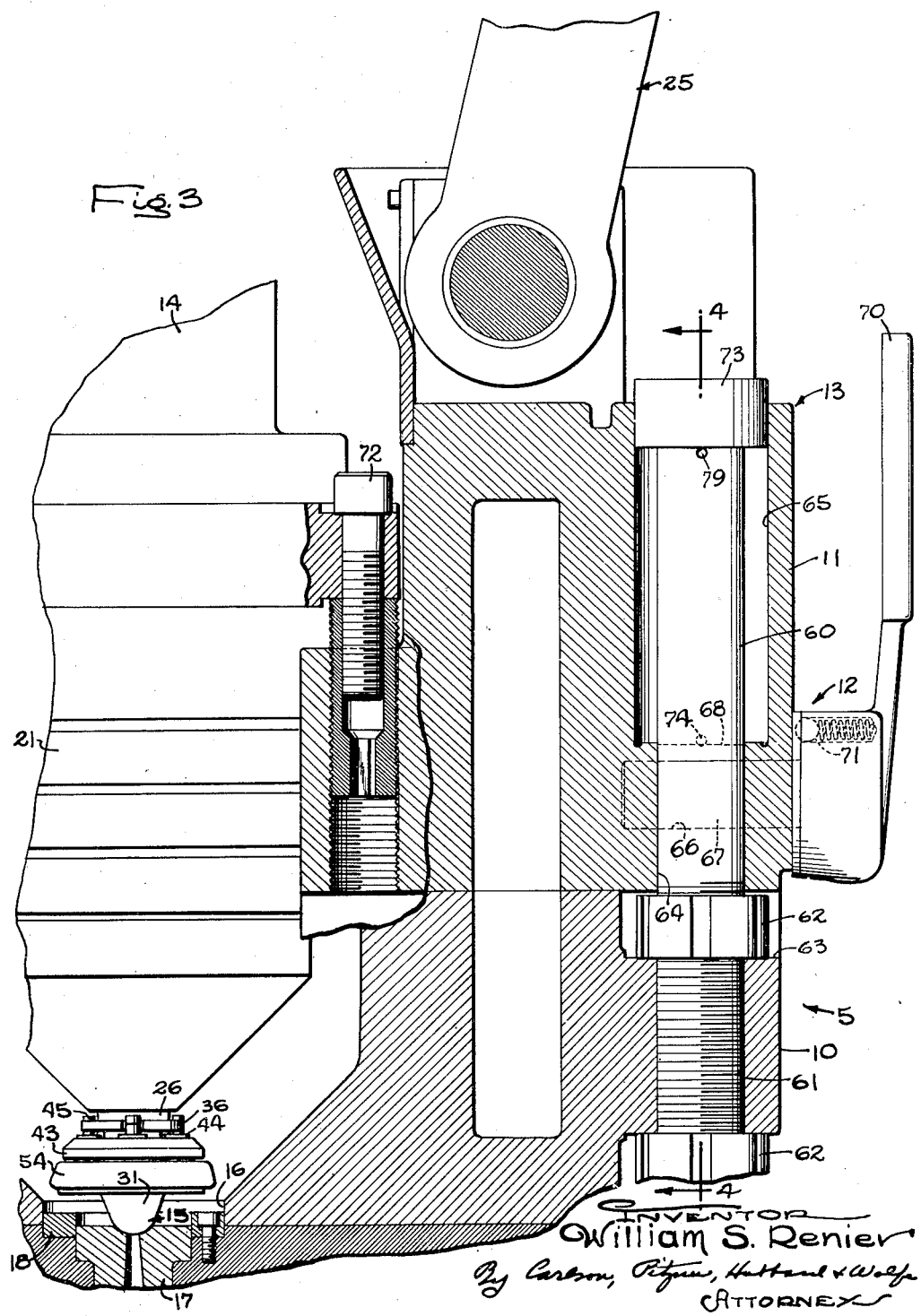

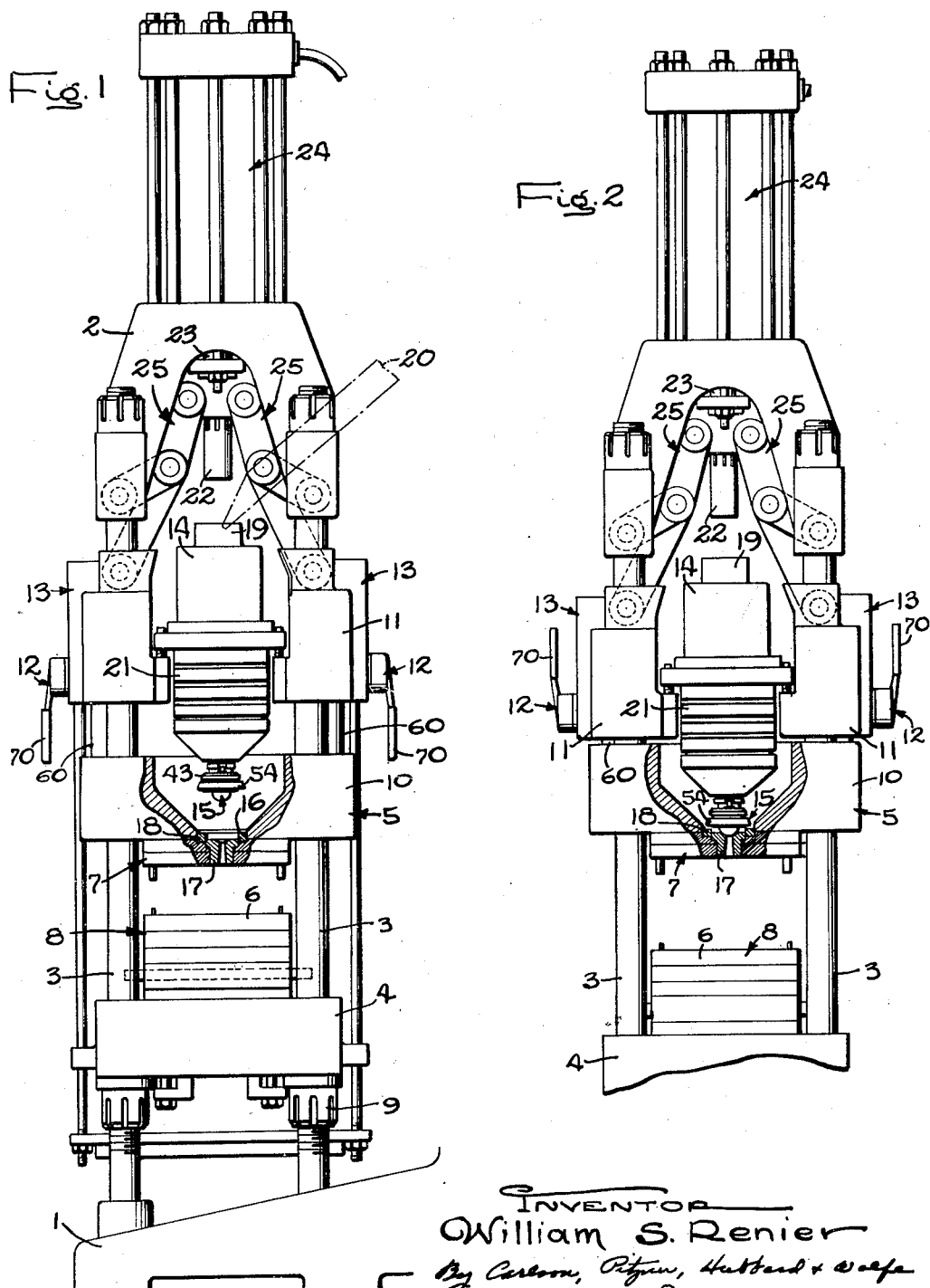

Aug. 28, 1951 W. S. RENIER 2,565,522
MOLDING MACHINE
Filed May 5, 1947 4 Sheets-Sheet 3
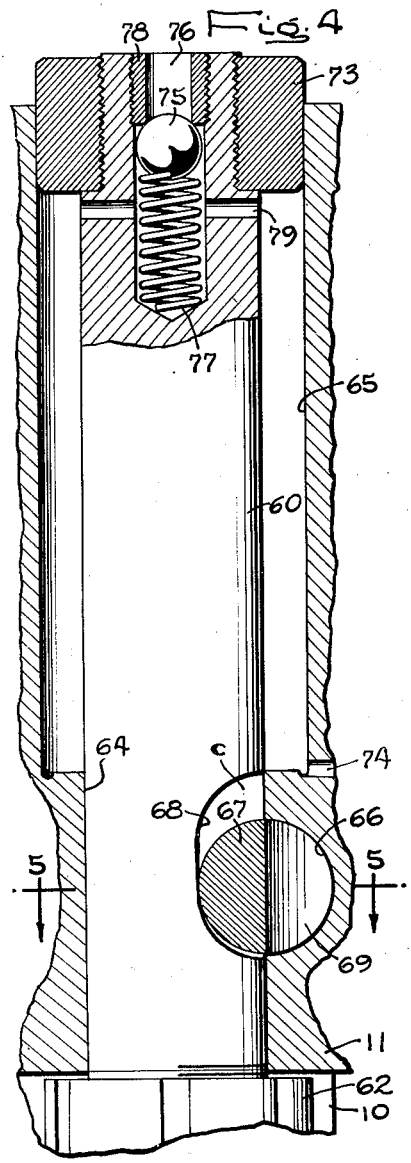
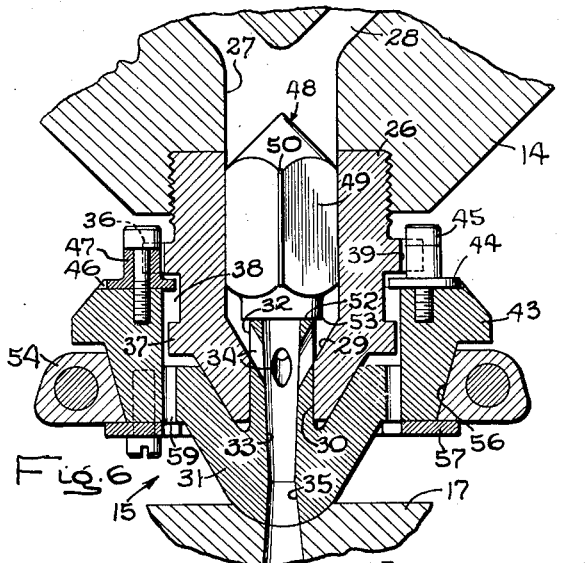
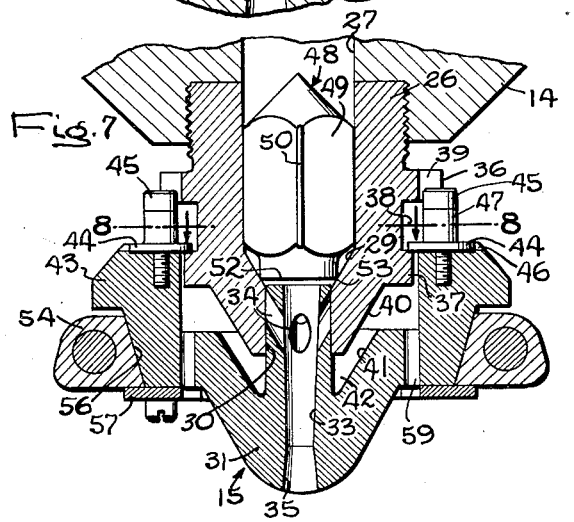
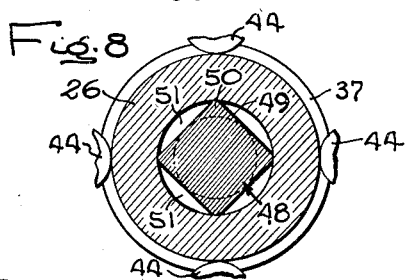
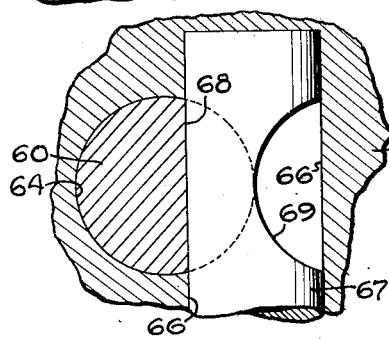
INVENTOR
William S. Renier
By Carlson, Pitzner, Hubbard & Wolfe
ATTORNEYS Aug. 28, 1951 W. S. RENIER 2,565,522
MOLDING MACHINE
Filed May 5, 1947 4 Sheets-Sheet 4
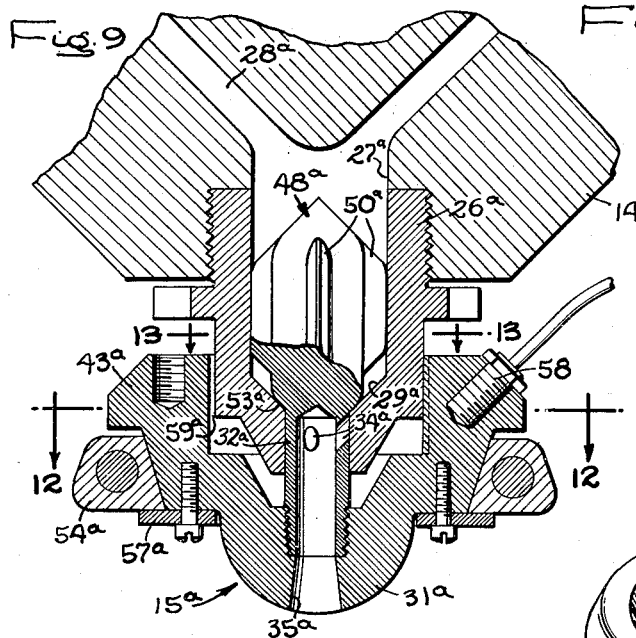
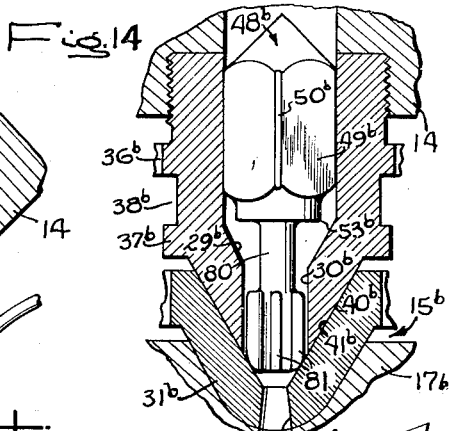
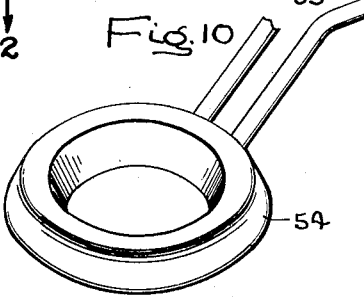
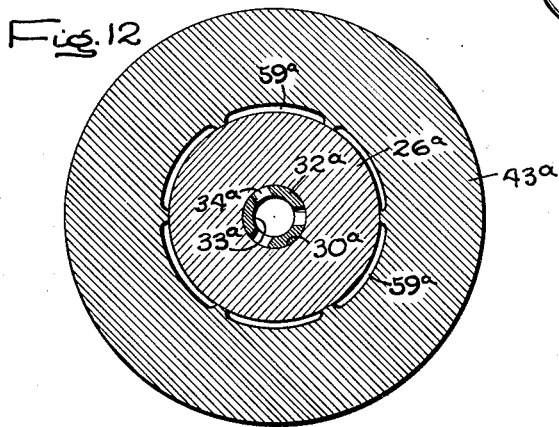
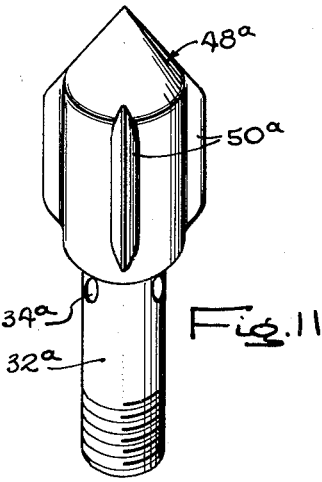
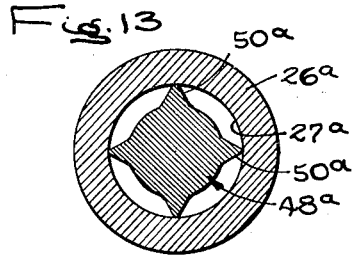
INVENTOR
William S. Renier
By Carlson, Pitney, Hubbard & Wolfe
ATTORNEYS Patented Aug. 28, 1951

2,565,522

UNITED STATES PATENT OFFICE 2,565,522

MOLDING MACHINE

William S. Renier, Fond du Lac, Wis., assignor to Giddings & Lewis Machine Tool Company, Fond du Lac, Wis., a corporation of Wisconsin Application May 5, 1947, Serial No. 745,993

5 Claims. (Cl. 18—30)

The present invention relates to improvements in machines for pressure injection molding or die casting of plastics and like materials, and has particular reference to a new and improved nozzle for discharging material to the die or mold cavity.

One of the objects of the present invention is to provide, for use in a plastic molding or die casting machine, a material discharge nozzle having a free-floating fully internally-contained shut-off valve which is entirely independent of the die construction, and which is automatically operable into open and closed positions respectively in response to the final closing and initial opening movements of the die sections.

Another object is to provide a nozzle for molding machines which comprises an adapter body capable of being attached to the discharge end of a heating cylinder, an orifice tip having a limited axial floating connection with the adaptor body, and an internally contained shut-off valve for controlling the flow of plasticized material from the heating cylinder to the tip orifice and shiftable into open and closed positions respectively in response to movement of the tip in opposite directions on the body.

A further object is to provide a plastic molding machine having a die plate with vertically separable parts for supporting one of the die sections, disengageable locking means for securing said parts in closed position with limited lost motion normally defining a small clearance therebetween adapted to be taken up by the die clamping pressure, and fluid means for supporting the lowermost part from the other part in substantially spaced relation when the locking means is disengaged, and for damping the separating movement between said parts.

Another object is to provide a plastic molding machine having a sectional die plate with two parts having a limited lost motion connection and normally separated by a small clearance adapted to be taken up by application of the die clamping pressure, one of said parts having a sprue passage, and a shut-off injection nozzle having a body mounted on the other of said parts, and an axially floating orifice tip on said body and opening to said passage, and shiftable by relative movement of said parts in opposite directions to open and close the flow passage to the tip orifice.

A further object is to provide an injection nozzle for molding machines having an orifice tip and an orifice shut-off valve, and heating means on said tip for maintaining plastic material at said valve plasticized.

A general object of the invention is to provide an automatic shut-off nozzle for molding machines which is simple, efficient and reliable in operation, which will not drool or become fouled by congealed plastic material, and which is self-contained and hence adapted for use as a simple attachment on a large variety of molding machines.

Other objects and advantages will become apparent as the description proceeds.

In the accompanying drawings,

Figure 1 is a front elevational view of a molding machine provided with a shut-off nozzle embodying the features of the present invention, and illustrating the two parts of a movable die plate in open position.

Fig. 2 is a fragmentary view similar to Fig. 1, but illustrating the die plate parts locked, but not clamped, in closed position.

Fig. 3 is a fragmentary vertical sectional view on an enlarged scale of the machine, with the parts of the die plate locked and clamped together.

Fig. 4 is a fragmentary sectional view taken along line 4—4 of Fig. 3 of the lost motion locking means for the separable parts of the die plate.

Fig. 5 is a transverse sectional view taken along line 5—5 of Fig. 4.

Fig. 6 is a fragmentary axial sectional view of the lower portion of the heating cylinder and the attached shut-off nozzle, and illustrates the nozzle in open position.

Fig. 7 is a view similar to Fig. 6 but illustrating the nozzle in closed or shut-off position.

Fig. 8 is a transverse sectional view taken along line 8—8 of Fig. 7.

Fig. 9 is a view similar to Fig. 8, but illustrating a modified form of nozzle.

Fig. 10 is a perspective view of a heating element adapted for use with either form of nozzle.

Fig. 11 is a perspective view of the valve member employed in the shut-off nozzle of Fig. 9.

Figs. 12 and 13 are transverse sectional views taken respectively along lines 12—12 and 13—13 of Fig. 9.

Fig. 14 is a fragmentary sectional view of a second modified form of cutoff nozzle with heating means thereon.

Referring more particularly to the drawings, the invention relates primarily to a self-contained shut-off nozzle adapted for injecting or discharging plasticized material from a heating cylinder into a die or mold cavity, the nozzle having a floating orifice tip movable to control the outlet passage to the discharge orifice, and being adapted for use in any molding machine having parts relatively movable in response to opening and closing of the die or mold to shift the orifice tip into open or shut-off position. In the present instance, the nozzle, constituting the exemplary embodiment of the invention, is shown incorporated in a molding machine of the type disclosed in my Patent No. 2,416,349, issued February 5, 1947.

The molding machine shown in the drawings, comprises an upright frame constructed of a base 1, a vertically spaced head 2, and a plurality of quadrilaterally spaced vertical tie rods 3 rigidly interconnecting the base and head, and constituting guide members for stationary and movable die plates 4 and 5. Secured in any suitable manner in opposed relation respectively to the adjacent surfaces of the die plates 4 and 5 are two separable sections 6 and 7 of a suitable die or mold 8.

The stationary die plate 4 is adjustably supported by and clamped to a plurality of locating nuts 9 threaded on the lower portions of the tie rods 3. The movable die plate 5 is sectional in character, and comprises a lower half 10 and an upper half 11 slidable jointly and relatively to each other on the tie rods 3. A disengageable locking means 12 is provided for securing the halves 10 and 11 of the movable die plate 5 in closed position, but with a limited lost motion normally defining a small clearance therebetween adapted to be taken up when the die sections 6 and 7 are clamped together. In addition suspension means 13 is provided for supporting the lower half 10 in substantially spaced or open relation from the upper half 11 of the movable die plate 5 when the locking means 12 is disengaged.

A vertically disposed heating cylinder 14 is supported on the upper half 11 of the movable die plate 5, and has an injector nozzle 15 at the lower end normally opening to the upper section 7 of the die or mold 8 when the halves 10 and 11 of the plate are locked together. More particularly, the lower half 10 of the die plate 5 is formed with a central opening 16 through which the nozzle 15 is projected for engagement with a sprue bushing 17 in the upper die section 7. Preferably, a pilot ring 18 is secured to the die section 7 concentrically about the sprue bushing 17 for a guiding fit in the opening 16 when the halves 10 and 11 of the movable die plate 5 are locked in closed position with limited lost motion therebetween. It will be understood that when the locking means 12 is disengaged, the halves 10 and 11 are fully separated so as to retract the nozzle 15 from the sprue bushing 17.

The heating cylinder 14 has an axial feed opening 19 at the upper end into which plastic material in any suitable form may be directed by a supply chute 20, and is provided with heating means 21 for generating the heat necessary to plasticize the material in its downward course of movement toward the nozzle 15.

To provide means for forcing charges of plasticized material under heavy molding pressure from the heating cylinder 14 through the nozzle 15 and the sprue bushing 17 into the mold cavity, an injection plunger 22 is supported from the head 2 in alinement with and for movement repeatedly into the feed opening 19 in a succession of pressure strokes for recurring machine cycles. Within the broad aspects of the invention, any suitable power means may be utilized for reciprocating the injection plunger 22. In the present instance, the plunger 22 is rigidly secured coaxially to the lower end of a piston rod 23 forming part of a reciprocatory hydraulic actuator 24 mounted vertically on the top of the head 2. The actuator 24 is connected through two parallel acting toggle mechanisms 25 as disclosed in my aforesaid patent for reciprocating the movable die plate 5 toward and from the stationary plate 4 to close and open the die or mold 8, in predetermined timed relation to the reciprocation of the injection plunger 22. More particularly, the actuator 24 serves, through the toggle mechanisms 25 and during each forward pressure stroke to lower the movable die plate 5 until the die 8 is closed, and thereafter to maintain the die under clamping pressure, while directly continuing the advance of the injection plunger 22 into the feed opening 19 of the heating cylinder 15 to complete the pressure stroke. In the reverse operation of the actuator 24, the injection plunger 22 is retracted from the heating cylinder 14, and then the die plate 5 is lifted from the plate 4 to open the mold 8 so as to effect or permit removal of the molded workpiece.

The primary feature of the present invention resides in the provision of a self-contained shut-off nozzle 15 which will prevent the drooling of plasticized material into the sprue bushing 17 after the sprue has been broken off in the initial opening movement of the die sections 6 and 7, and which at the same time is heated at the tip so as to prevent the material therein from cooling and congealing, and interfering with the proper operation of the relatively movable parts. In its preferred form, the nozzle 15 comprises a hollow body or adapter 26 which is threaded into the lower discharge end of the heating cylinder, and which is formed with an axial bore 27 in open communication with the heating chamber 28. At the outer end, the bore 27 has a tapered section 29 defining a conical valve seat opening to a coaxial outlet guide bore 30.

Slidably mounted on the outer end portion of the nozzle body 26 for relative axial floating movement is an orifice tip 31. While the tip 31 may be provided in any suitable shape, it preferably is conical in form, and rounded at the outer end to interfit tightly with the sprue bushing 17, and has an axial stem 32 extending slidably into the bore 30. The stem 32 is formed with an axial passage or bore 33 opening through a plurality of inclined peripherally spaced holes 34 for communication with the bore 27, and connected at the outer end with a discharge orifice 35. Preferably, the holes 34 are in valving relationship with the bore 30 so that when the stem 32 is moved inwardly, they are fully open to the bore 27, and when the stem is out, they are entirely or substantially closed.

To provide a lost motion or floating connection between the orifice tip 31 and the body or adapter 26, the latter is formed on the outer periphery with two axially spaced circumferential ribs or flanges 36 and 37 defining an intermediate annular groove 38. The upper flange 36 is formed with a series of arcuate notches 39 adapted for engagement by a spanner wrench (not shown). The outer end of the body 26 is tapered axially to define a conical external seat 40 adapted to engage with a complementary internal surface 41 defined by an annular groove 42 in the inner face of the orifice tip 31. A concentric peripheral base flange 43 on the orifice tip 31 extends in loosely telescoping relation over the outer end of the body 26. Attached to the base end of the flange 43 and projecting therefrom into the groove 38 in overhanging relation to the stop flange 37 is a suitable stop means for limiting the outward movement of the orifice tip 31. In the present instance, the stop means comprises a plurality of stop washers 44 secured by means of screw bolts 45, as inserts, in circular recesses 46 in the inner end surface of the flange 43. The inner edge portions of the recesses 46 are intersected by the inner edge of the flange 43 so that the corresponding portions of the washers 44 project into the groove 38 for engagement with the flange 37. Preferably, spacers 47 are fitted on the bolts 45 so that the latter will project upwardly into correspondingly spaced notches 39 in the flange 36 to constrain the orifice tip 31 against rotation.

A shut-off valve is enclosed within the nozzle body 26 to control the supply of plasticized material under pressure from the heating chamber 28 to the orifice 35. This valve may be provided in various forms, and in the present instance comprises a free floating torpedo or valve member 48 separable from but engageable endwise by the stem 32 of the orifice tip 31. The valve member 48 has a sliding fit in the body 26, and is formed on the periphery with a plurality of spaced flats 49 separated by longitudinal guide ribs 50 with narrow lands coacting with the surface of the bore 27 to define a plurality of down flow passages 51. The lower or outer end of the valve member 48 is reduced in diameter substantially tangent to the flat surfaces 49, and is formed with a flat end face 52 adapted for surface engagement with the inner end of the stem 32, and defining a peripheral valve edge 53 adapted for engagement with the conical valve seat 29.

Since the nozzle 15 is located at a considerable distance from the heating means 21 of the cylinder 14, plastic material trapped therein during the periods between successive injection cycles tends to cool, and if this material were to congeal it would interfere with the normal operation of the orifice tip 31 and the valve member 48, and would clog up the flow passages to the nozzle orifice 35. To avoid any such difficulty, suitable means is provided for directly heating the tip 31 in close proximity to the orifice 35. This means comprises an annular electrical heating element 54 having suitable electrical leads 55, and attached in encircling relation directly to the flange 43. Preferably, the lower portion of the flange 43 is tapered to define a conical seat 56, and the inner peripheral surface of the heating element 54 is similarly tapered to engage therewith. A clamp ring 57, bolted to the flange 43, serves to maintain the element 54 in position. A temperature measuring device, such as a thermocouple 58, may be threaded into one side of the flange 43. Any plastic material that may leak or seep past the stem 32 into the interior of the tip flange 43 may drain therefrom through openings 59.

It will be evident that when the halves 10 and 11 of the movable die plate 5 are locked together, but not clamped, the clearance between the parts will permit the nozzle tip 31 and the free floating valve member 48 to move outwardly in response to the pressure within the heating cylinder 14, thereby forcing the valve edge 53 into contact with the seat 29 and closing the holes 34, to cut off communication to the flow passage 33.

The locking means 12 for the separable halves 10 and 11 of the movable die plate 5 may be of any suitable character, and in the present instances are provided in duplicate and of like construction respectively at opposite sides of the machine. In the preferred form, each locking means 12 comprises a vertical supporting rod 60 rigidly connected at the lower end to the lower half 10 of the plate 5. More particularly, the rod 60 has a threaded portion extending through a bore 61 and secured in axial position therein by suitable nuts 62 tightened against opposite faces of the plate half 10. The upper nut 62 is inserted in a notch 63 so as to avoid interference with the plate half 11. The upper portion of the rod 60 projects slidably through a guide bore 64 and thence into an enlarged cylinder bore 65 in the plate half 11. Formed in the plate half 11 is a short transverse bore 66 intersecting on its diameter with the bore 64, and providing a bearing for a rotary locking pin 67. A transverse locking notch 68 is cut in one side of the supporting pin 60 to receive and interlock with the projecting side portion of the pin 67. The width of the notch 68 is somewhat greater than the diameter of the locking pin 67 so as to provide a limited amount of lost motion through the clearance C. Similarly formed in one side of the locking pin 67, to the center axis is an arcuate release notch 69 conforming in shape to the peripheral curvature of the pin 60. A hand lever 70 is secured to the outer end of the pin 67 for rotatably adjusting the latter, and is provided with a yieldable detent 71 for retaining the lever in different selective positions of adjustment. The arrangement is such that when the locking pin 67 is adjusted into one rotary position to locate the notch 69 in alinement with the rod 60, the latter will be released to permit separation of the lower half 11, by the force of gravity from the upper half 10, into fully open position, and when the locking pin is rotated through 180° to locate the solid portion thereof in the notch 68 it will be effective to lock the plate halves in closed position with a small clearance therebetween. This clearance is sufficient to permit closing of the nozzle valve. Adjustable screw means 72 are provided in the mounting for the heating cylinder 14 to permit proper location of the latter in relation to the plate half 10.

The suspension means 13 for supporting the plate half 10 in fully open position comprises a piston 73 attached to the upper end of the rod 60 and slidable in the cylinder 65. The piston 73 in effect constitutes a stop element engageable with the lower end of the cylinder 65 to limit the extent of separating movement. In order to snub the drop and thereby prevent objectionable impact at the end, the cylinder 65 and piston 73 are constructed to constitute a dashpot. Thus, the lower end of the cylinder 65 has an air outlet 74 which may be suitably restricted or connected to an adjustable flow restriction, and the piston rod 60 is provided with an inlet check valve for freely admitting air during upward movement. The valve comprises a ball 75 in a valve passage 76 normally urged outwardly by a spring 77 against an inwardly facing seat 78, and the passage opens through ports 79 to the cylinder 65.

Figs. 9–13 show a slightly modified form of self-contained shut-off nozzle in which the orifice tip 31a and valve member 48a are rigidly connected for movement as a unit. Corresponding parts are identified by the same reference numerals as in Figs. 1–8 plus the letter a. In this form, the stem 32a is integral with the torpedo 48a, and is rigidly threaded at the outer end into the tip 31a. The torpedo or valve member 48a is generally cylindrical in form, and provided with peripherally spaced longitudinal ribs 50a on the exterior for guiding engagement in the nozzle body 26a. The outer end of the torpedo 48a is formed with a tapered valve face 53a adapted for engagement with the valve seat 29a to close the flow passage from the body 26a to the orifice 35a. Since the torpedo 48a is attached to the tip 31a, it will limit outward floating movement of the latter thereby permitting elimination of the stop flange 37. The inner peripheral surface of the flange 43a is formed with spaced guide ribs in sliding contact with the body 26a, and defining vent passages 59a. In other respects, the construction is closely similar to that of the first form.

The second modified form of nozzle shown in Fig. 14 is generally similar to the first two forms, and hence corresponding parts are identified by the same reference numerals plus the letter "b." In this form, the tip 31b is provided without an axial stem, and the recess 41b is conical and opens to the orifice 35b. The valve member 48b has an axial stem 80 of reduced diameter extending in peripherally spaced relation through the bore 35b for end engagement by the tip 31b. The outer end of the stem is provided with peripherally spaced longitudinal flutes 81. Thus, material passing or flowing through the nozzle flushes all of the internally exposed surfaces.

In the operation of the machine, assuming that the parts are in the position shown in Fig. 1, the lower half 10 of the plate 5 will be spaced from the upper half 11 by the small clearance C permitted by the locking notches 68 in the supporting pins 60, and hence the nozzle tip 31 will occupy its outermost position to locate the nozzle valve 48 in closed position. Upon downward movement of the die plate 5, initial pressure contact between the die sections 6 and 7 will take up the lost motion and clamp the halves 10 and 11 together. Consequently, the nozzle tip 31 will be shifted inwardly to lift the valve member 48 as the die or mold 8 is being clamped. Thereafter, the injection plunger 22 will continue on its pressure stroke to force a charge of plasticized material through the nozzle 15 into the die 8. In the initial upward movement of the plunger 22 after injection, the upper half 11 of the movable plate 5 will be lifted from the lower half 10 sufficiently to effect closing of the nozzle valve. Thereafter, the movable plate 5 is lifted as a unit to open the die. In such opening movement, the sprue of the workpiece is broken away substantially at the orifice 35, and withdrawn from the sprue bushing 17. However, no drooling of plasticized material from the orifice 35 can occur since the material flow is cut off by the valve member 48. The heating element 54 on the orifice tip 31 maintains the material within the nozzle 15 in a properly plasticized state at all times so that it will not congeal in the orifice 35 or the valve passages leading thereto, and hence will not interfere with the proper and efficient operation of the valve member 48.

I claim as my invention:

1. A discharge nozzle for plastic material comprising, in combination, a hollow nozzle body having an outlet passage and with an inwardly facing annular valve seat at the outer end of said passage, a nozzle tip having a central discharge orifice and movable on said body, a stem on said tip and slidable in said passage, said stem having a down-flow passage opening to said orifice and a radial port opening to said down-flow passage and movable with said stem reversibly either out of said outlet passage into communication with the interior of said body or into said outlet passage to interrupt said communication, and an elongated free floating torpedo-shaped valve member slidably guided in said passage for longitudinal movement into and out of engagement with said seat and defining longitudinal downflow passages, said valve member being normally responsive to the pressure of the material in said outlet passage to move outwardly toward said seat, said stem upon movement into said outlet passage being engageable with the outer end of said valve member to lift the latter from said seat and upon movement out of said outlet passage disengaging from said valve member to release the latter for engagement with said seat.

2. In a molding machine, a shut-off nozzle comprising, in combination, an adaptor body adapted to be secured to the discharge end of a heating cylinder for plastic material, said body being formed with a valve seat opening inwardly to a guide bore, a free floating valve member slidably guided in said bore and having a valve face engageable with said seat to close said bore, a nozzle tip telescopically mounted for limited axial movement on said body and having a central discharge orifice, a tubular stem on said tip and extending slidably through said guide bore for separable end abutment with said valve member to lift the latter from said seat, interengageable lost motion stop means externally on said body and tip for positively limiting the extent of movement of said tip on said body, means for constraining said tip against rotation, and an annular heating element removably secured in concentric encircling relation directly to said nozzle tip.

3. A plastic molding machine comprising, in combination, a die plate having vertically separable parts for supporting one of two die sections adapted to be moved into and out of closely contiguous closed position, disengageable locking means comprising a supporting rod for securing said parts in said closed position, said rod being anchored to one of said parts and extending slidably through a bore into a cylinder in the other of said parts, and being formed with a transverse locking notch, a locking pin movable into positive lost motion engagement in said notch, suspension means for supporting the lowermost one of said parts when said locking means is disengaged and comprising a piston on said supporting rod and slidable in said cylinder, and fluid controlled means for damping the downward movement of said piston.

4. An injection nozzle for molding machines comprising a nozzle body having a material supply passage, a conical nozzle tip having an axial discharge orifice for communicating with said passage and having an external circumferential radial flange formed with a conical seat on the perimeter, means for removably securing said tip to said body, an annular heating element having a tapered inner peripheral surface complemental to and removably engaging said conical seat with a tight wedge fit in position to encircle said discharge orifice, and a retainer ring removably bolted to said flange and engaging said heating element to maintain said element on said seat.

5. A discharge nozzle for plastic material comprising, in combination, a hollow adaptor body having an interior bore and a discharge end with an outlet passage opening coaxially from said bore, said discharge end being tapered to define an internal inwardly facing annular valve seat and a coaxial external conical seat, an elongated valve member having longitudinal guide ribs slidably guided in said bore for movement into and out of engagement with said valve seat and defining down-flow passages between said ribs to said seat, a nozzle tip having a central hollow conical section formed with an axial discharge orifice and being interiorly complemental to and movable into and out of engagement with said conical seat, an axial tumbler stem on said conical section open to said orifice and adapted to open to said valve seat, a concentric peripheral flange on said conical section telescopically disposed about said body, axially spaced stop flanges on the exterior of said body and defining an intermediate annular groove, stop means secured to said flange and projecting inwardly therefrom into said groove to confine said tip for limited axial lost motion on said body, said stem upon movement of said conical section into engagement with said conical seat being engageable with said valve member to lift said valve member from said valve seat and to establish communication of said stem with said bore.

WILLIAM S. RENIER.

REFERENCES CITED

The following references are of record in the file of this patent:

UNITED STATES PATENTS

| Number | Name | Date |
|---|---|---|
| 2,244,842 | Knowles | June 10, 1941 |
| 2,259,781 | Shaw et al. | Oct. 21, 1941 |
| 2,273,516 | Dinzl | Feb. 17, 1942 |
| 2,318,031 | Tucker | May 4, 1943 |
| 2,345,917 | Coffman | Apr. 4, 1944 |
| 2,359,839 | Goessling | Oct. 10, 1944 |
| 2,416,348 | Renier | Feb. 25, 1947 |

FOREIGN PATENTS

| Number | Country | Date |
|---|---|---|
| 687,987 | Germany | Feb. 9, 1940 |

OTHER REFERENCES

Ser. No. 381,674, Thilenius (A. P. C.), published Apr. 27, 1943.